United States Patent [19]

Quenot

[11] 4,131,244
[45] Dec. 26, 1978

[54] TAPE MEASURE BRAKE

[75] Inventor: Michel Quenot, Besancon, France

[73] Assignee: Stanley-Mabo S.A., Besancon, France

[21] Appl. No.: 864,834

[22] Filed: Dec. 27, 1977

Related U.S. Application Data

[63] Continuation of Ser. No. 776,305, Mar. 10, 1977, abandoned.

[30] Foreign Application Priority Data

Mar. 29, 1976 [FR] France .................................. 76 09869

[51] Int. Cl.² ........................ B65H 75/48; G01B 3/10
[52] U.S. Cl. .................................. 242/107.2; 33/138; 242/84.8
[58] Field of Search ................. 242/107.2, 107.3, 84.8, 242/99, 107.6, 107.4 R; 33/138; 188/65.1, 65.2

[56] References Cited

U.S. PATENT DOCUMENTS

| 2,814,881 | 12/1957 | Jungberg | 242/84.8 X |
| 3,812,588 | 5/1974 | Bennett | 242/84.8 X |
| 3,816,925 | 6/1974 | Hogan et al. | 242/84.8 |

Primary Examiner—Philip R. Coe
Assistant Examiner—John M. Jillions
Attorney, Agent, or Firm—Prutzman, Kalb, Chilton & Alix

[57] ABSTRACT

An encased spring-wound tape-rule has adjacent the tape outlet slot a brake consisting of a brake block formed on a pivoted and longitudinally slidable lever which is pivotably connected to a pivoted control button to form a toggle or elbow joint providing stable braking and tape-freeing positions, without the usual biasing spring.

11 Claims, 5 Drawing Figures

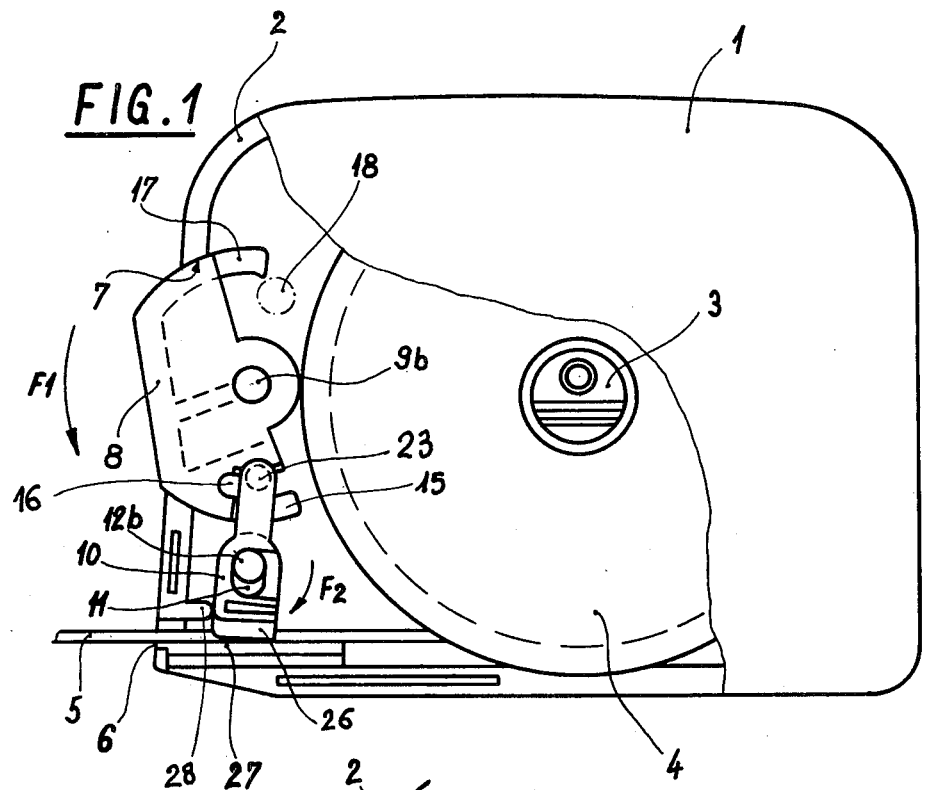
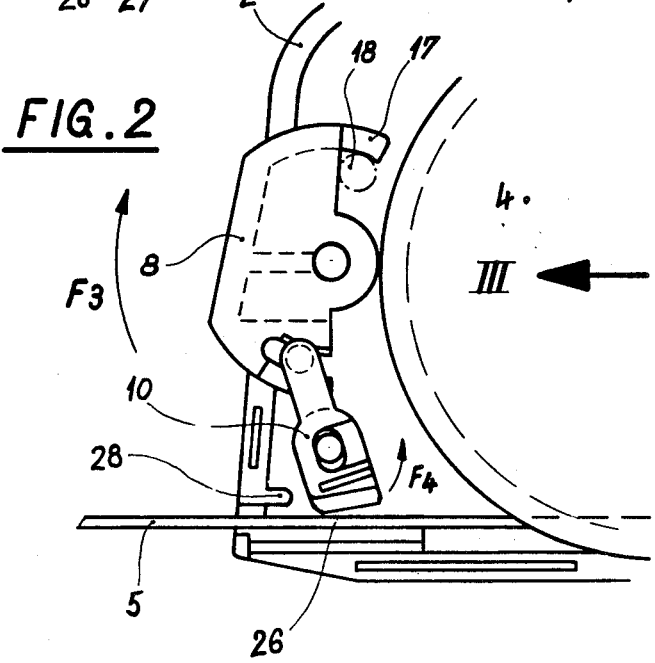

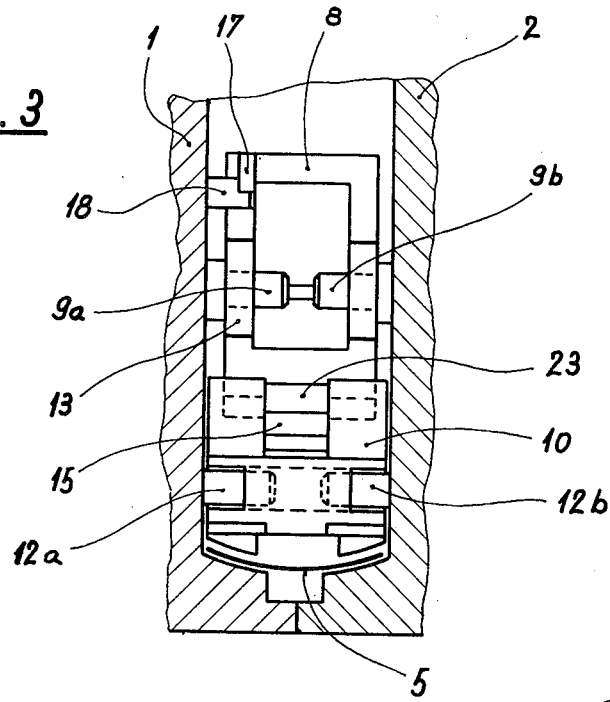
FIG. 3
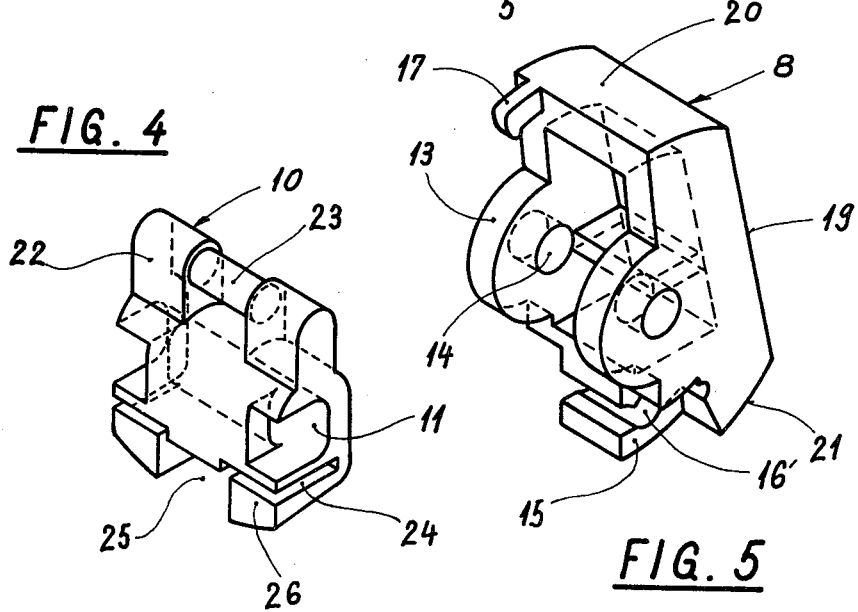
FIG. 4
FIG. 5

TAPE MEASURE BRAKE

This is a continuation, of application Ser. No. 776,305, filed Mar. 10, 1977, now abandoned.

The invention concerns tape rules and the like linear measuring instruments including a casing having an outlet slot for a measuring-tape which is wound on a winding drum, a tape return spring and a tape locking device which comprises a control button lodged in an opening in a front wall of the casing above the outlet slot and a brake which in its locking position grips the tape against an inner bearing face of the casing.

One already knows linear measuring instruments of this type in which the locking device is formed by a rounded piece movable along an arcuate guide in the casing and whose inner end, which forms the brake block, exerts a pressure on the tape in the locking position. However, the locking position is not stable and the lever remains in its position only by friction in a manner to retain the tape against the action of the return spring.

Moreover, numerous linear measuring instruments are provided with a tape braking system which enables the user to stop the tape in any position out of the casing, especially against the action of the return spring or to brake the tape as it is wound into the casing. For example, one of these devices is provided with a braking lever articulated to the casing and biased by a spring into the braking position in a manner to permanently jam the tape. A pressure exerted on this lever against the action of the spring enables the brake block to be displaced to free the tape.

However, most of the known devices only enable a single stable position, either locking or unlocking, of the locking device, which position is defined either by a biasing spring or by an elastic jamming.

The invention aims to simplify the components of a tape braking mechanism and their assembly while eliminating the necessity for a biasing spring, and to provide an instrument in which both the locking and unlocking positions are stable, this instrument also being able to have a fairly great locking effect for a slight pressure exerted on a braking lever.

To this end, the tape locking device of a tape rule or the like linear measuring instrument according to the invention comprises first and second levers pivotally connected together about a pin to form an elbow-joint, the first lever forming the control button and being tippably mounted about a first pivot fixed with the casing and parallel to the axis of the winding drum, the second lever having an end opposite said pin forming said brake block and being tippably mounted and movable in translation in its longitudinal direction by engagement of an oblong hole in the second lever about a second pivot fixed with the casing and parallel to the first pivot, a line of junction connecting said first and second pivots being at least approximately perpendicular to said bearing face, said levers being able to tip between an unlocking position in which said pin is spaced apart on one side of said line of junction and the brake block is spaced apart from the tape, and said locking position defined by an abutment fixed with the casing and in which said pin is located on the other side of said line of junction, said brake block when in said locking position coacting with the tape to hold the first and second levers in the locking position which is thus made stable, and comprising means for releasably holding the first and second levers in the unlocking position.

One thus obtains a measuring instrument whose braking device includes few constituent parts, is simple to assemble and easy to manipulate. This device also enables the obtention of a large braking force on the tape when it is pulled out of the casing to carry out a measurement and also has the advantage of avoiding the production of a slight withdrawal of the tape in relation to its exact measuring position during the locking operation. This advantage is very appreciable when the user carries out an "internal" measuring operation.

In a preferred embodiment of the invention, the pin is integral with one of the two levers and the other lever has an elastic projection defining an arcuate slot in which said pin is inserted, the opposite walls of this slot being each provided with a part-cylindrical housing receiving said pin. One thus obtains a rapid and simple assembly of the two levers, which assembly is achieved simply by pressing the pin into its housing and which does not necessitate the presence of screws or any securing members.

As a variation, the pivots of the two levers could be integral with the respective levers, the pivot of the first lever (control button) engaging corresponding journals in the casing, and the pivot of the second lever being engaged in oblong slots or grooves in the casing generally perpendicular to the tape, so that the second lever is able to tip and move in translation towards and away from the tape.

An embodiment of the invention will be described, by way of example, with reference to the accompanying drawings, in which:

FIG. 1 is a side elevational view of a tape rule with its casing partly cut away and the brake in a tape-locking position;

FIG. 2 is a view corresponding to part of FIG. 1 but with the brake in a released position;

FIG. 3 is a view along arrow III of FIG. 2 with the casing shown partly in cross-section;

FIG. 4 is a perspective view of a locking lever; and

FIG. 5 is a perspective view of a control button.

The tape rule shown comprises a casing formed of two shells 1, 2 and in which is mounted for rotation about an axle 3 fixed on one of the shells, a winding drum 4 of a metal measuring tape 5 one end of which passes through a slot 6 of the casing whereas the other end is connected to a return spring, not shown.

The locking device comprises two levers articulated to one another to form an elbow or toggle joint; the first lever forming a control button 8 whereas the second lever forms a locking piece 10 provided with a brake block 26.

In the lateral wall of the casing adjacent the tape outlet slot 6 and disposed generally perpendicular to the direction of outlet of the tape 5 is an opening 7 through which the control button 8 protrudes. Button 8 is tippably mounted about a first axis parallel to the axle 3 of the drum, formed by two aligned pivots 9a, 9b each integral with and protruding from the respective inner face of a shell 1, 2.

The control button 8 (FIG. 5) is formed of a hollow piece whose lateral walls directed towards the outside of the casing are extended by lugs 13 each provided with a central circular hole 14 for receiving the pivots 9a, 9b. The lower end of button 8, i.e., directed towards the tape-outlet slot 6, is extended by an elastic tongue 15 which defines with an inner wall of the button a transverse arcuate slot 16, the opposed walls of this slot being each provided with a partly-cylindrical housing 16' the purpose of which will be specified later. The other, upper end of the control button 8 is provided with a slightly arched resilient arm 17 forming a retaining stud and projecting in extension of one of the lateral walls of the button. This arm 17 is disposed so that, in the released position of the device, it engages an embossment 18 on the inner face of shell 1.

The second lever forming the locking member 10 is freely articulated at the lower end of the control button 8 by a pin 23 which is received in the cylindrical housings 16' of button 8. Member 10 is pivotally mounted on a second pivot parallel to the drum axle 3 and formed, as the first pivot, by two aligned pivots 12a and 12b each integral with and protruding from the inner face of a respective shell 1, 2.

The locking member 10 (FIG. 4) is in the form of an approximately prismatic piece whose upper end has two arms 22 between which, and made in one piece therewith, is the articulating pin 23, whereas its lower end has two lateral elastic tongues 26 formed in the piece by transverse slots 24 which each lead into a lateral face of the member, the tongues 26 being separated from one another by a central recess 25. Tongues 26 form a brake block; their lower face is slightly conical and they are thicker towards the side of the lateral face of the piece into which the slot 24 leads. The dimensions of the member 10 are such that its lower conical face is situated in the proximity of the upper face of the tape 5 near the outlet slot 6 (see FIG. 3). Moreover, so as to improve braking while reducing wear, the curvature of the lower faces of the tongues 26 is approximately identical to the natural curvature of the tape 5, so that in the braking position the lower faces of the tongues 26 are applied, over the greater part of their surface, against the upper face of the tape 5, this being made possible by the elasticity of the tongues 26 which may bend slightly, closing the slot 24.

The locking member 10 also includes transverse oblong guide openings 11 defining slots through which the pivots 12a, 12b, pass, these slots being arranged with their longitudinal axis perpendicular to pin 23.

Furthermore, control button 8 has a planar external face 19 and arcuate upper and lower faces 20 and 21 centred about the axis of hole 14 (i.e., pivots 9a, 9b), and the upper and lower walls of the opening 7 of the casing have the same curvature to permit the free passage of the button 8 as it tips about the pivots 9a, 9b.

Assembly of the two levers, control button 8 and locking member 10 is very simple since it suffices to clip the pin 23 in the cylindrical housings 16' of the control button 8 then to mount the assembly on the pivots (e.g. 9a, 12a) integral with one of the shells (e.g. 1) of the casing. The other shell is then fitted on the first with the pivots 9a, 9b; 12a, 12b aligned, and secured by means of screws not shown.

To place the device in the locking position (FIG. 1) it suffices to tip the control button 8 in the direction indicated by arrow F1. The lower end of button 8 tips in the same direction and drives the pin 23 so that the locking member 10 pivots in the opposite direction according to arrow F2 about pivots 12a, 12b and, thanks to the slots of openings 11, moves down and comes to apply against the upper face of the tape 5 which is pressed against an internal embossment 27 of the casing in the vicinity of the tape outlet slot 6. A maximum braking pressure is reached when the pin 23 is aligned with the line joining the axes of pivots 9a, 9b and 12a, 12b. In this intermediate position, nearly all of the conical faces of the tongues 26 is applied against the upper face of the tape 5, the transverse slot 24 thus being slightly closed. But this position with pin and pivots aligned is not stable and the tipping movement of the button 8 is continued slightly in the direction F1 until the member 10 comes to contact an abutment 28 formed inside the casing. The effect of this is to accentuate deformation of the tongues 26 and closing of the slot 24 in view of the elasticity and the slight conical shape of these tongues. In this position the pin 23 is spaced apart, towards the inside of the casing, from the line connecting the axes of fixed pivots 9a, 9b; 12a, 12b. Any movement of the tape 5 is thus prevented and the locking position is stable.

To unlock the tape (FIG. 2), it suffices to tip the control button 8 about its pivots 9a, 9b in the opposite direction, indicated by arrow F3. The lower end of button 8 drives the pin 23 and consequently the upper end of member 10 to the other side of the line joining the axes of pivots 9a, 9b and 12a, 12b, the member 10 pivoting about the pivots 12a, 12b in the direction of arrow F4 while having an upwards translational movement thanks to the slots of openings 11, so that the lower end of locking member 10 is spaced apart from the tape 5. In this released position, the stud-forming arm 17 of button 8 engages embossment 18 to releasably hold the device in this position.

Thanks to the thus-formed system of levers, the locking device enables a strong braking pressure to be obtained on the tape for a relatively low pressure applied on the control button 8.

Preferably, the constituent parts of the locking device, i.e., control button and locking member, are of a plastics material, such as nylon or Delrin, which has a good strength and elasticity.

The invention is not limited to the described embodiment and one may of course preview other forms of control button and locking member without departing from the scope of the invention as defined in the following claims.

What is claimed is:

1. In a tape rule or the like linear measuring instrument comprising a casing having an outlet slot for a measuring-tape wound on a winding drum, a tape return spring and a tape locking device which comprises a control button disposed in an opening in a front wall of the casing above the tape outlet slot and a brake block which in a locking position grips the tape against an inner bearing face of the casing, the improvement in which the tape locking device comprises first and second levers pivotally connected together about a pin to form an elbow-joint, the first lever forming the control button and being tippably mounted about a first pivot fixed with the casing and parallel to the axis of the winding drum, the second lever having an end opposite said pin forming said brake block and being tippably mounted and movable in translation in its longitudinal direction by engagement of an oblong hole in the second lever about a second pivot fixed with the casing and parallel to the first pivot, a line of junction connecting said first and second pivots being at least approximately perpendicular to said bearing face, said levers being able to tip between an unlocking position in which said pin is spaced apart on one side of said line of junction and the brake block is spaced apart from the tape, and said locking position defined by an abutment fixed with the casing and in which said pin is located on the other side of said line of junction, said brake block when in said locking position coacting with the tape to hold the first and second levers in the locking position which is thus made stable, and comprising means for releasably holding the first and second levers in the unlocking position.

2. An instrument according to claim 1, in which said pin is integral with one of said two levers, the other lever having an elastic projection defining an arcuate slot in which said pin is inserted, opposite walls of said slot being provided facing partly-cylindrical housings receiving said pin.

3. An instrument according to claim 2, in which the control button is hollow piece having lateral walls extended by two lugs provided with circular openings receiving said first pivot, and a lower wall forming said elastic projection, said pin being integral with the second lever.

4. An instrument according to claim 1, in which the brake block is formed of at least one elastic tongue on said end of the second lever and separated from the main part of said lever by an according to claim 1, in which the brake block is formed of at least one elastic tongue on said end of the second lever and separated from the main part of said lever by an open slot.

5. An instrument according to claim 1, in which the casing is formed of two shells, and said first and second pivots are each formed of two aligned pivots each integral with a respective one of the two shells.

6. An instrument according to claim 1, in which said means for holding the first and second levers in the unlocking position comprises an elastic arm protruding beyond the free end of the first lever and an embossment integral with the casing, said elastic arm engaging said embossment when the control button is in the unlocking position.

7. In a tape rule or the like linear measuring instrument comprising a casing having an outlet slot for a measuring-tape wound on a winding drum, a tape return spring and a tape locking device which comprises a control button disposed in an opening in a front wall of the casing above the tape outlet slot and a brake block which in a locking position grips the tape against an inner bearing face of the casing, the improvement in which the tape locking device comprises first and second levers pivotally connected together about a common first pivoting axis to form an elbow-joint, the first lever forming the control button and being tippably mounted about a second fixed pivoting axis parallel to the axis of the winding drum, the second lever extending to an end part forming said brake block and being tippably mounted about a third axis parallel to the winding drum and movable in translation towards and away from the tape, a line of junction connecting said second and third pivoting axes being at least approximately perpendicular to said bearing face, said levers being able to tip between an unlocking position in which said first pivoting axis is spaced apart on one side of said line of junction and the brake block is spaced apart from the tape, and a locking position defined by an abutment of the casing and in which said first pivoting axis is located on the other side of said line of junction with said brake block coacting with the tape to make the locking position stable, and comprising means for releasably holding the first and second levers in the unlocking position.

8. In a tape rule or the like linear measuring instrument comprising a casing having an outlet slot for a measuring-tape wound on a winding drum, a tape return spring and a tape locking device which comprises a control button and a brake block which in a locking position grips the tape against an inner bearing face of the casing, the improvement in which the tape locking device comprises first and second levers pivotally connected together about a common first pivoting axis to form an elbow-joint, the first lever forming the control button and being tippably mounted about a second fixed pivoting axis, the second lever extending to an end part forming said brake block and being tippably mounted about a third axis and movable in translation towards and away from the tape, said levers being able to tip between an unlocking position in which said first pivoting axis is spaced apart on one side of a line of junction connecting said second and third pivoting axes and the brake block is spaced apart from the tape, and a locking position in which said first pivoting axis is located on the other side of said line of junction with said brake block coacting with the tape.

9. An instrument according to claim 8 in which said line of junction is approximately perpendicular to said bearing face.

10. An instrument according to claim 8 in which an abutment of said casing defines said locking position.

11. An instrument according to claim 8 including means for releasably holding the first and second levers in the unlocking position.

* * * * *